United States Patent
Ahmad et al.

(10) Patent No.: US 7,416,394 B2
(45) Date of Patent: Aug. 26, 2008

(54) GAS TURBINE AND ROTOR BLADE FOR A TURBOMACHINE

(75) Inventors: Fathi Ahmad, Kaarst (DE); Michael Dankert, Offenbach (DE)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 10/576,617

(22) PCT Filed: Oct. 4, 2004

(86) PCT No.: PCT/EP2004/011055
§ 371 (c)(1), (2), (4) Date: Apr. 21, 2006

(87) PCT Pub. No.: WO2005/046927
PCT Pub. Date: May 26, 2005

(65) Prior Publication Data
US 2007/0128041 A1    Jun. 7, 2007

(30) Foreign Application Priority Data
Oct. 23, 2003   (EP) .................................. 03024445

(51) Int. Cl.
*B63H 1/28* (2006.01)

(52) U.S. Cl. ................................ 416/231 B; 416/231 R

(58) Field of Classification Search ............. 416/231 B, 416/231 R, 235, 236 R
See application file for complete search history.

(56) References Cited

U.S. PATENT DOCUMENTS 6,490,791 B1    12/2002   Surace et al.
6,951,447 B2 *  10/2005   Cherolis et al. .......... 416/193 A

FOREIGN PATENT DOCUMENTS

| JP | 10061406 A | 3/1998 |
| JP | 10299408 A | 11/1998 |
| JP | 2000018001 A | 1/2000 |
| JP | 2000130103 A | 5/2000 |

* cited by examiner

*Primary Examiner*—Igor Kershteyn

(57) ABSTRACT

The invention relates to a rotating blade for a turbomachine which can be cross flown by a flow medium, especially for a gas turbine which can be cross flown by a working fluid. The gas turbine comprises a rotating blade base, a platform region which extends in a perpendicular manner thereto and a curved blade profile all of which are arranged in a successive manner. The blade profile extends from a front edge, against which a liquid can flow, to a rear edge between which a suction side and a pressure side of the blade profile are formed by means of a relief slot comprising a longitudinal extension in the blade profile. In order to produce a rotating blade which has increased durability, the relief slot on the end of the blade profile oriented towards the platform region is arranged in the region of the rear edge, extending through the blade profile from the suction side to the pressure side and the longitudinal extension thereof is oriented in an essentially transversal manner in relation to the direction of flow of the working fluid.

17 Claims, 3 Drawing Sheets

GAS TURBINE AND ROTOR BLADE FOR A TURBOMACHINE

CROSS REFERENCE TO RELATED APPLICATIONS

This application is the US National Stage of International Application No. PCT/EP2004/011055, filed Oct. 4, 2004 and claims the benefit thereof. The International Application claims the benefits of European Patent application No. 03024445.3 filed Oct. 23, 2003. All of the applications are incorporated by reference herein in their entirety.

FIELD OF THE INVENTION

The invention relates to a rotor blade for a turbomachine, in particular for a gas turbine, in accordance with the claims and to a gas turbine in accordance with the claims.

BACKGROUND OF THE INVENTION

Gas turbines coupled to generators are used to convert fossil energy into electrical energy. For this purpose, along its rotor shaft a gas turbine has a compressor, a combustion chamber and a turbine. During operation, the compressor draws in ambient air and compresses it. Then the compressor air is mixed with a fuel and fed to the combustion chamber, where the mixture is burnt to form a hot working medium which flows into the turbine, which is connected downstream of the combustion chamber and in which blades and vanes are provided. The guide vanes, which are secured to the housing of the turbine, divert the working medium onto the rotor blades secured to the rotor, so that they set the rotor in rotary motion. The rotational energy of the rotor which is taken up in this way is then converted into electrical energy by the generator coupled to the rotor.

The rotor blades of the gas turbine are exposed to mechanical stresses, in particular caused by centrifugal force. In particular under the action of the high temperatures of the working medium, cracks may form in the blade material, shortening the service life of the rotor blades. Long-term stresses can then lead to crack growth. Under the loads which are present, the blade then fails, with the blade fracturing or fragments becoming detached. This can lead to damage to the blades and vanes located downstream as seen in the direction of flow of the working medium. Crack formation and crack propagation therefore needs to be monitored at regular servicing intervals.

U.S. Pat. No. 6,490,791 has described a method in which in a service process cracks in the trailing edge of a turbine blade are eliminated by cutting back the trailing edge. The aerodynamic losses caused by the shortening of the trailing edge are kept at a low level by subsequent rounding of the blade profile.

JP 2000018001 shows a rotor blade for a gas turbine in which notches extending in the radial direction are introduced at the stripping edge. This leads to a reduction in the thermal stresses in this region.

JP 10299408 shows a gas turbine guide vane which in the transition region from platform to vane profile has elliptical relief notches, the main axis of which is oriented transversely with respect to the main stressing direction, in order to avoid crack growth.

SUMMARY OF THE INVENTION

It is an object of the invention to specify a blade of a turbomachine having an increased service life. A further object of the invention is to specify a gas turbine having a blade of this type.

According to the invention, the object relating to a blade is achieved by the features of the claims. Advantageous configurations are given in the subclaims.

The solution provides for the relief slot to be arranged in the region of the trailing edge at that end of the main blade profile which faces the platform region, to extend through the main blade profile from the suction side to the pressure side and to have a longitudinal extent which is oriented substantially transversely with respect to the direction of flow of the flow medium.

The invention is based on the discovery that cracks are often formed at the trailing edge of the main blade profile, in the region near to the platform, and under ongoing stresses these cracks grow in the direction of the leading edge of the main blade profile. The crack propagation in the axial direction, i.e. in the direction of flow of the flow medium, is effectively limited by the slot, which is to be considered here as an elongate opening, the longitudinal extent of which is larger by a multiple than its transverse extent.

It is preferable for the leading edge to be spaced apart from the trailing edge along a profile chord having the chord length A. In this case, the relief slot is provided at a distance of at least 90% of the chord length from the leading edge. This favorable position means that cracks which form in the axial direction starting from the trailing edge have a maximum and negligible length of 10% of the chord length.

In an advantageous configuration, the main blade profile has a blade height which extends perpendicular to the profile chord. In its longitudinal extent, the relief slot has a length which is in the range from 5% to 10% of the blade height. Since the region at the trailing edge of the rotor blade which is at particular risk of cracking lies in the region close to the platform, the cracks which form there will mostly end at the relief slot.

In a preferred refinement, the end of the relief slot which faces the platform region is at a distance of from 5% to 10% of the blade height from the platform region.

If the relief slot is rounded at the end of its longitudinal extent, stress peaks are avoided in the surrounding blade material, so that new cracks do not form and grow from there.

If the relief slot is filled with a filler material which has a coefficient of thermal expansion which is less than or equal to that of the blade material, the filler material does not cause any compressive stresses in the blade material in the event of thermal stressing of the blade. The presence of a compressive stress of this nature in the blade material would promote unfavorable crack growth. Furthermore, pressure losses in the flow medium through an open relief slot are avoided.

If the filler material is a solder, this solder can be introduced into the relief slot at lower temperatures than the temperatures which are required to produce the rotor blade. It is in this way possible to avoid recrystallization of the blade material.

It is expedient for the trailing edge of the rotor blade to be uncooled. The trailing edges of rotor blades with open cooling usually have a multiplicity of film-cooling openings which extend in the axial direction and cool the trailing edges. If a large open relief slot of this type, from which cooling air emerges, were to be provided instead of film-cooling openings, an excessive pressure loss in the cooling air could occur in the blade, which would then promote the penetration of hot gas into the rotor blade. Therefore, it is preferable to provide for the use of an open relief slot for rotor blades with an uncooled trailing edge.

It is particularly advantageous to provide relief slots in the case of single-crystalline or directionally solidified turbine rotor blades, which on account of their smaller grain boundaries in the blade material are more prone to crack formation than conventionally cast blades. Accordingly, in particular here it is important to limit the crack propagation.

The object relating to the gas turbine is achieved by the features of the claims.

BRIEF DESCRIPTION OF THE DRAWINGS

The invention is explained with reference to a drawing, in which.

DETAILED DESCRIPTION OF THE INVENTION

Figure 2:
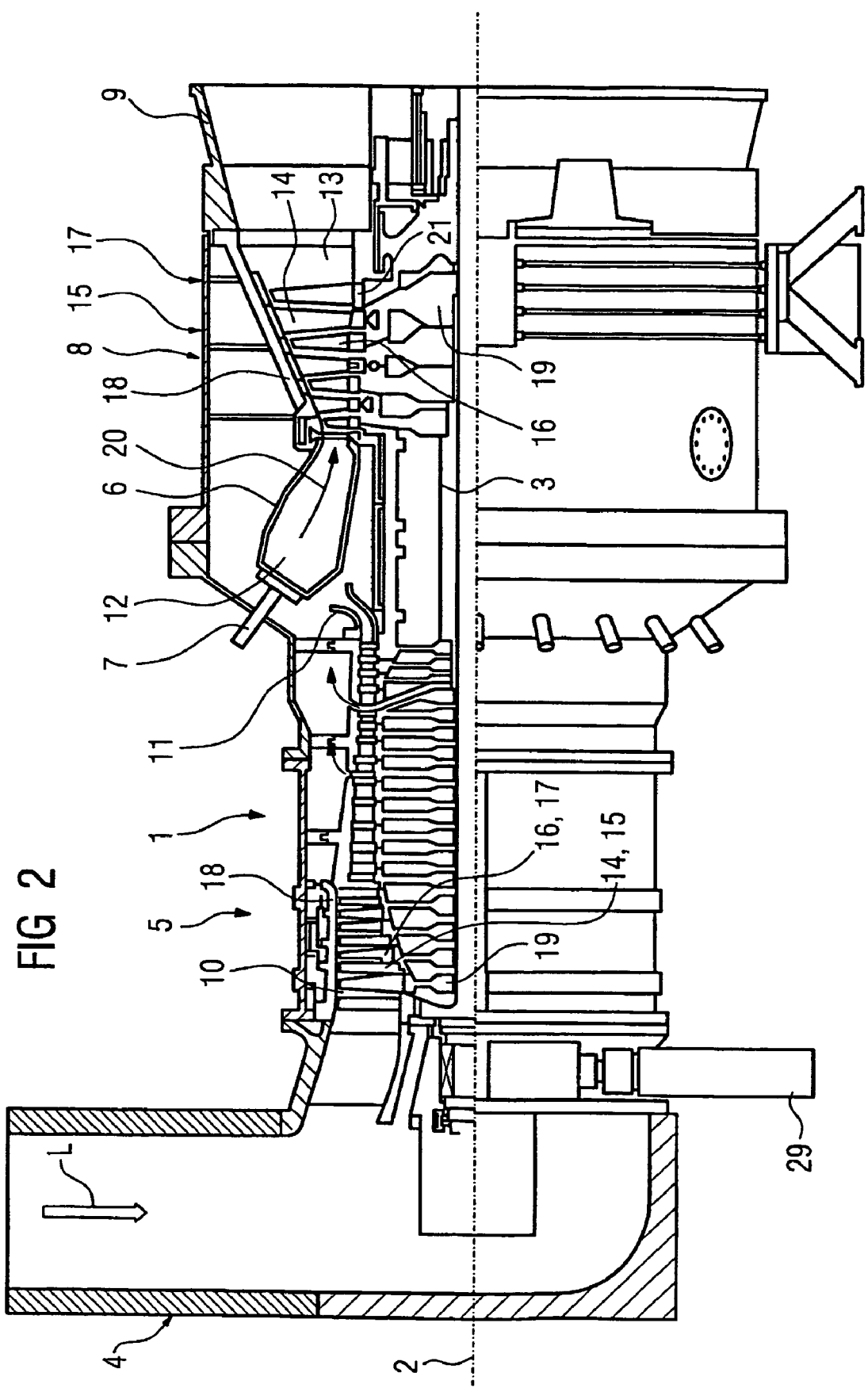
FIG. 2 shows a gas turbine in the form of a longitudinal part-section.

FIG. 2 shows a gas turbine 1 in the form of a longitudinal part-section. In its interior, it has a rotor 3 which is mounted such that it can rotate about an axis of rotation 2 and is also referred to as the turbine rotor or rotor shaft. An intake housing 4, a compressor 5, a toroidal annular combustion chamber 6 with a plurality of coaxially arranged burners 7, a turbine 8 and the exhaust-gas housing 9 follow one another along the rotor 3.

An annular compressor duct 10, which in cross section narrows in the direction of the annular combustion chamber 6, is provided in the compressor 5. At the combustion chamber exit of the compressor 5 there is arranged a diffuser 11 which is flow-connected to the annular combustion chamber 6. The annular combustion chamber 6 forms a combustion space 12 for a mixture of a fuel and compressed air. A hot-gas duct 13 arranged in the turbine 8 is flow-connected to the combustion space 12, with the exhaust-gas housing 9 being arranged downstream of the hot-gas duct 13.

Blade and vane rings are arranged alternately in the compressor duct 10 and in the hot-gas duct 13. A guide vane ring 15 formed from guide vanes 14 is in each case followed by a rotor blade ring 17 formed from rotor blades 16. The stationary guide vanes 14 are connected to a guide vane carrier 18, whereas the rotor blades 16 on the rotor 3 are connected by means of a disk 19.

While the gas turbine 1 is operating, the compressor 5 sucks in air through the intake housing 4 and compresses it in the compressor duct 10. Air L provided at the burner end of the compressor 5 is passed through the diffuser 11 to the burners 7, where it is mixed with a fuel. The mixture is then burnt to form a working fluid 20 in the combustion space 10. From there, the working fluid 20 flows into the hot-gas duct 13. The working fluid 20 is expanded at the guide vanes 14 arranged in the turbine 8 and at the rotor blades 16 in such a manner as to transfer its momentum, so that the rotor 3 is driven, and with it a generator coupled to it (not illustrated) is likewise driven.

Figure 1:
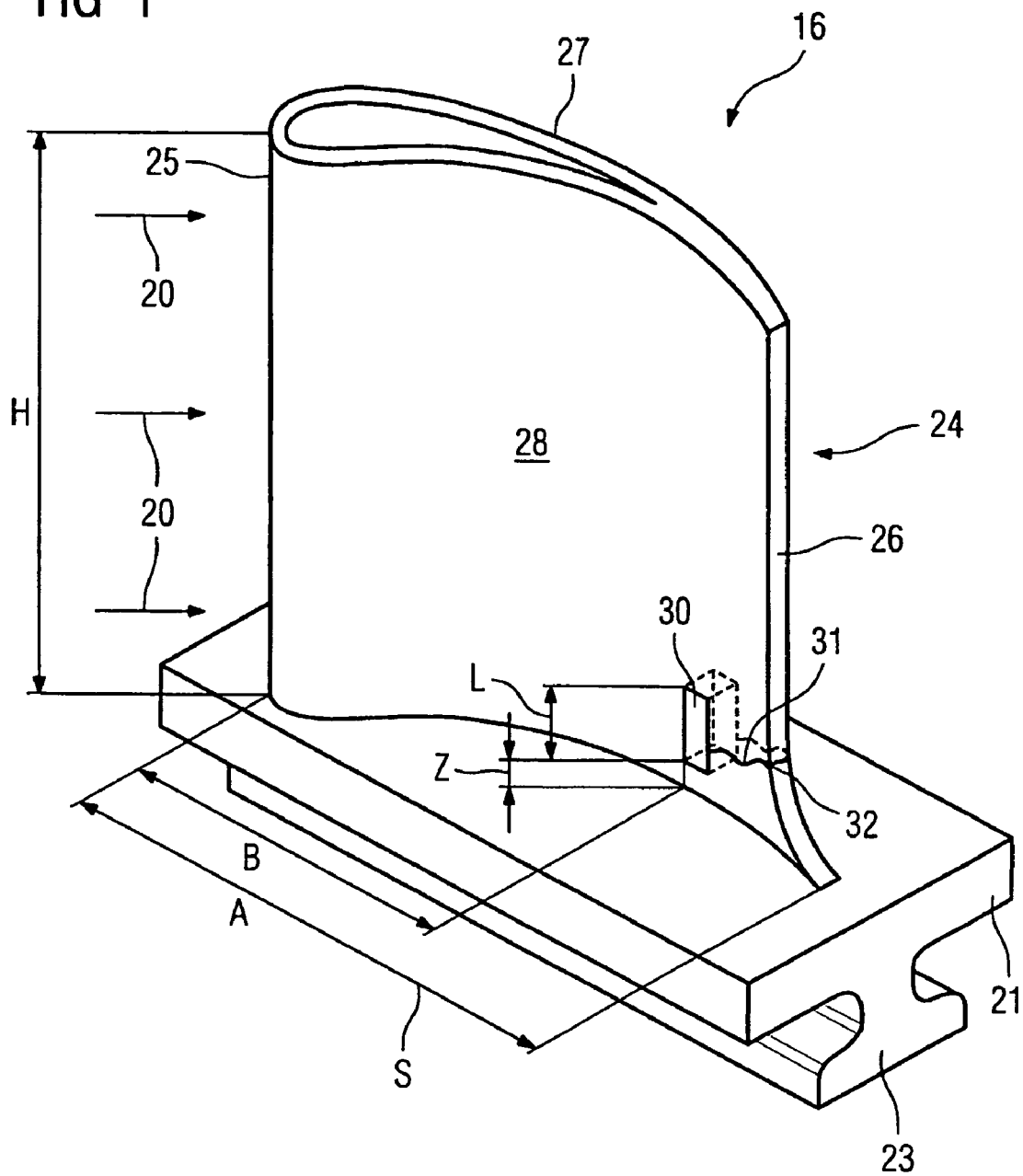
FIG. 1 shows a rotor blade according to the invention for a turbine.

FIG. 1 shows a hollow rotor blade 16 according to the invention for a turbine 8, having a rotor blade root 23, on which a platform 21 is integrally formed. The platform 21 is followed by the main blade profile 24, around which a working fluid 20 flows. As seen in the direction of flow of the working medium 20, the main blade profile 24 extends from a leading edge 25 to a trailing edge 26. Two blade walls extend from the leading edge 25 to a trailing edge 26, at which they converge, to form a suction side 27 and a pressure side 28. A relief slot 30 is provided in the region of the trailing edge 26, in the region 29 close to the platform. The relief slot 30 has a length L and is at a height distance Z from the platform 21. The profile chord S of the main blade profile 24 extends from the leading edge 25 to the trailing edge 26 with a chord length A.

The relief slot 30 is arranged in the rear region close to the trailing edge 26, so that it is at a distance B of at least 90% of the chord length A from the leading edge 25.

The main blade profile 24 has a height H. The length L of the relief slot 30 is in the range from 5% to 10% of the height H of the main blade profile 24. The distance Z from the relief slot 30 to the platform 21 is likewise in a range from 5% to 10% of the height H of the main blade profile 24.

On account of the thermal stresses acting on the rotor blade 16, and in particular the high centrifugal forces, cracks may form in the main blade profile 24, in particular in the region of the trailing edge 26. These cracks grow from the trailing edge 26 in the direction of the leading edge 25, in particular in the region 29 close to the platform, since the centrifugal forces are highest there. A crack of this type is illustrated in FIG. 1 and denoted by reference numeral 31.

From the point of formation 32, the crack 31 grows in the direction of the leading edge 25 and ends at the relief slot 30. Further growth of the crack 31 is prevented by the relief slot 30. Accordingly, damage to the gas turbine 1 is avoided and service intervals are shortened, since fewer defective turbine rotor blades need to be exchanged during a servicing process. It is particularly advantageous to provide relief slots 30 in single-crystalline or directionally solidified turbine rotor blades 16, which on account of their smaller grain boundaries in the blade material 34 are more susceptible to the formation of cracks. Since the cracks 31 end in the relief slot 30, it is possible to prevent a critical crack length from being exceeded.

FIG. 3 shows various embodiments of relief slots 30. The elongate relief slots 30 are arranged in the region of the platform 21 close to the trailing edge 26 and have differently shaped rounded portions 35 at the ends of their longitudinal extent.

Figure 3A:
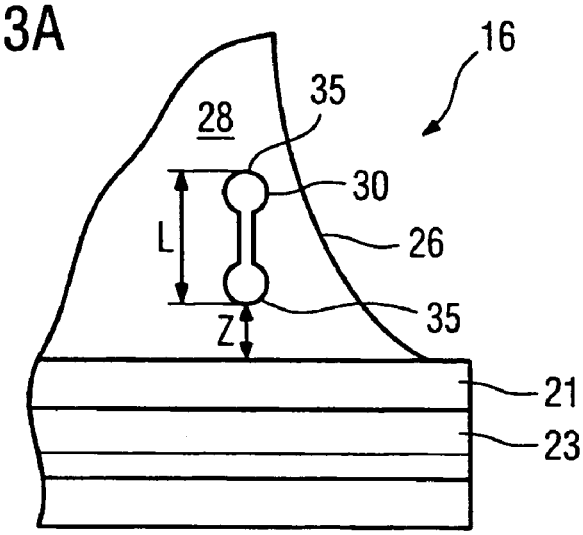
FIG. 3 shows the rotor blade with a rounded relief slot.
Figure 3B:
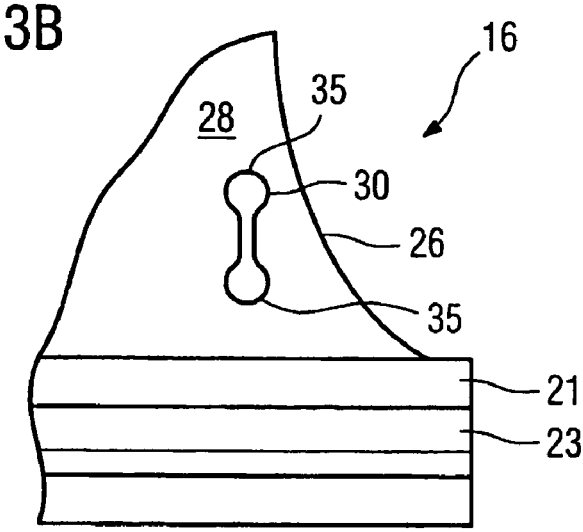
Figure 3C:
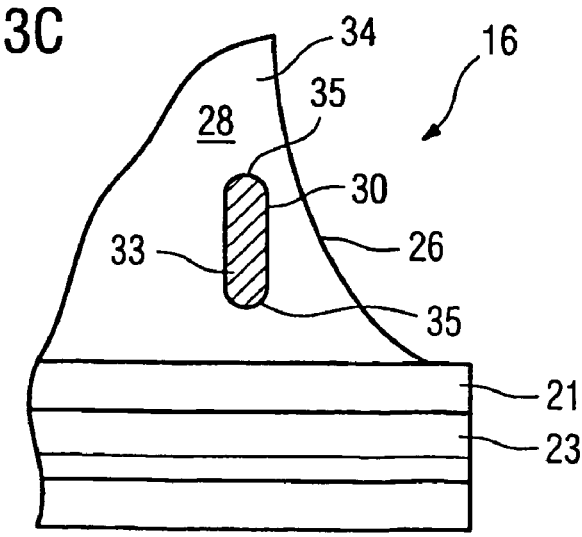

FIGS. 3a and 3b show the relief slot 30 in the shape of a bone. In FIG. 3c, the relief slot 30 is in the shape of an elongate hole. The width of the relief slot 30 is in each case only 15% to 25% of its length L.

In FIG. 3c, the relief slot 30 is filled with a filler material 33. The filler material 33 prevents working fluid 20 from flowing from the pressure side 28 to the suction side 27, which entails losses.

To avoid further stresses in the blade material 34, the filler material 33, for example a solder, has a coefficient of thermal expansion which is less than or equal to that of the blade material 34.

The main blade profile 24 of the rotor blade 16 including the filled relief slot 30 could also be covered with a protective layer. The protective layer may in this case be an overlay layer, which is predominantly composed of the chemical elements MCrAlY, where M stands for Fe, Ni, Co. In addition, the protective layer could comprise a ceramic as thermal barrier coating.

The invention claimed is:

1. A rotor blade for an axial flow gas turbine engine, comprising:
   a blade root having a platform region;
   a curved main blade profile surface which extends from the platform region of the root, the blade profile having a suction side, a pressure side, a blade height, a leading edge, and a trailing edge where the trailing edge is located down-stream of the leading edge with respect to an operative working fluid flow direction;
   a first relief wall arranged parallel to a radial centerline of the blade and located in the main blade profile adjacent to the trailing edge, having a radially inner most edge and a radially outermost edge, and the first relief wall extends through the blade from the suction side to the pressure side of the main blade profile;
   a second relief wall parallel to the first relief wall having a radially inner most edge and a radially outermost edge, and extends through the blade from the suction side to the pressure side of the main blade profile;
   a third relief wall arranged between the radially inner most edges of the first and second relief walls extending through the blade from the suction side to the pressure side of the main blade profile; and
   a fourth relief wall arranged between the radially outer most edges of the first and second relief walls extending through the blade from the suction side to the pressure side of the main blade profile, wherein the first relief wall, second relief wall, third relief wall and fourth relief wall collectively define a relief slot arranged in the trailing edge region of the main blade profile.

2. The rotor blade as claimed in claim 1, wherein the relief slot is located from the leading edge 90% of the total distance from the leading to the trailing edge of the blade profile.

3. The rotor blade as claimed in claim 2, wherein the length of the relief slot is 5% to 10% of the blade height of the main blade profile.

4. The rotor blade as claimed in claim 3, wherein the radially inner most end of the relief slot is located from the platform region 5% to 10% of the blade height.

5. The rotor blade as claimed in claim 4, wherein the relief slot radially inner most and outermost ends are rounded.

6. The rotor blade as claimed claim 5, wherein the relief slot is filled with a filler material such that the pressure and suction side surfaces of the main blade profile are continuous and the filler material has a coefficient of thermal expansion less than or equal to that of the blade material.

7. The rotor blade as claimed in claim 6, wherein the filler material is a solder.

8. The rotor blade as claimed in claim 7, wherein the rotor blade material is single-crystalline or directionally solidified.

9. The rotor blade as claimed in claim 7, wherein the rotor main blade profile is covered with a Thermal Barrier Coating.

10. An axial flow gas turbine engine arranged about a central axis, comprising:
    a rotor mounted such that it can rotate about the central axis;
    an intake housing that intakes air;
    a compressor section that compresses the air;
    a combustion chamber that accepts the compressed air, introduces a fuel and combusts the fuel and compressed air to provide a hot working fluid; and
    a turbine section that expands the hot working fluid having a plurality of turbine blades attached to the rotor, the turbine blades comprise:
        a blade root having a platform region,
        a curved main blade profile surface which extends from the platform region of the root, the blade profile having a suction side, a pressure side, a blade height, a leading edge, and a trailing edge where the trailing edge is located down-stream of the leading edge with respect to an operative working fluid flow direction,
        a first relief wall arranged parallel to a radial centerline of the blade and located in the main blade profile adjacent to the trailing edge, having a radially inner most edge and a radially outermost edge, and the first relief wall extends through the blade from the suction side to the pressure side of the main blade profile,
        a second relief wall parallel to the first relief wall having a radially inner most edge and a radially outermost edge, and extends through the blade from the suction side to the pressure side of the main blade profile,
        a third relief wall arranged between the radially inner most edges of the first and second relief walls extending through the blade from the suction side to the pressure side of the main blade profile, and
        a fourth relief wall arranged between the radially outer most edges of the first and second relief walls extending through the blade from the suction side to the pressure side of the main blade profile, wherein the first relief wall, second relief wall, third relief wall and fourth relief wall collectively define a relief slot arranged in the trailing edge region of the main blade profile profile.

11. The gas turbine engine as claimed in claim 10, wherein the relief slot is located from the leading edge 90% of the total distance from the leading to the trailing edge of the blade profile.

12. The gas turbine engine as claimed in claim 11, wherein the length of the relief slot is 5% to 10% of the blade height of the main blade profile.

13. The gas turbine engine as claimed in claim 12, wherein the radially inner most end of the relief slot is located from the platform region 5% to 10% of the blade height.

14. The gas turbine engine as claimed in claim 13 wherein the relief slot radially inner most and outermost ends are rounded.

15. The gas turbine engine as claimed claim 14, wherein the relief slot is filled with a filler material such that the pressure and suction side surfaces of the main blade profile are continuous and the filler material has a coefficient of thermal expansion less than or equal to that of the blade material.

16. The gas turbine engine as claimed in claim 15, wherein the filler material is a solder.

17. The gas turbine engine as claimed in claim 15, wherein the rotor main blade profile is covered with a Thermal Barrier Coating.

* * * * *